(12) United States Patent
Gaw

(10) Patent No.: US 10,046,528 B2
(45) Date of Patent: Aug. 14, 2018

(54) COMPOSITE LAYERS WITH EXPOSED REINFORCEMENT

(75) Inventor: Kevin O'Brien Gaw, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 13/400,334

(22) Filed: Feb. 20, 2012

(65) Prior Publication Data

US 2013/0213685 A1 Aug. 22, 2013

(51) Int. Cl.
*B32B 37/00* (2006.01)
*B29C 70/88* (2006.01)
*B29C 70/64* (2006.01)
*B29C 70/54* (2006.01)

(52) U.S. Cl.
CPC .......... *B29C 70/882* (2013.01); *B29C 70/545* (2013.01); *B29C 70/64* (2013.01); *B29K 2995/0005* (2013.01); *Y02T 50/433* (2013.01); *Y10T 156/10* (2015.01)

(58) Field of Classification Search
CPC ......... Y10T 156/10; Y10T 428/249923; Y10T 428/23914; B29K 2995/0005; B29C 70/882; B29C 70/64; B29C 70/08; B29C 70/083; B29C 70/24; B32B 37/00; Y02T 50/433
USPC ..... 428/86, 223, 297.1, 298.1, 299.1, 300.7, 428/295.1, 297.4; 174/2; 156/60; 252/500
See application file for complete search history.

(56) References Cited

U.S. PATENT DOCUMENTS

| | | | |
|---|---|---|---|
| 2,359,090 | A | 9/1944 | Dyer, Jr. |
| 4,681,497 | A | 7/1987 | Berecz |
| 4,746,389 | A | 5/1988 | DiGenova |
| 4,820,376 | A | 4/1989 | Lambert et al. |
| 5,667,859 | A * | 9/1997 | Boyce et al. ............ 428/59 |
| 6,624,383 | B1 | 9/2003 | Lichtenstein et al. |
| 7,897,249 | B2 | 3/2011 | Pepka et al. |
| 7,947,773 | B2 | 5/2011 | Hansen et al. |
| 2008/0248230 | A1 | 10/2008 | Dewitte et al. |
| 2009/0035556 | A1 | 2/2009 | Shimada et al. |

(Continued)

FOREIGN PATENT DOCUMENTS

| | | | |
|---|---|---|---|
| JP | 2008-028258 | * | 7/2008 |
| JP | 2008546193 A | | 12/2008 |

(Continued)

OTHER PUBLICATIONS

EP search report dated Jun. 6, 2013 regarding application 13151015. 8-1703, reference 12 8rP488EP M2, applicant The Boeing Company, 6 pages.

(Continued)

*Primary Examiner* — Camie S Thompson
(74) *Attorney, Agent, or Firm* — Yee & Associates, P.C.

(57) ABSTRACT

A composite structure comprising a matrix and a reinforcement. The matrix comprises a substantially nonconductive material. The reinforcement comprises a conductive material. The reinforcement is located within the matrix to form a composite layer. A portion of the reinforcement is exposed at a surface of the composite layer such that electrical conductivity of the composite layer is increased in a direction substantially perpendicular to the composite layer.

10 Claims, 11 Drawing Sheets

(56) References Cited

U.S. PATENT DOCUMENTS

2009/0117269 A1    5/2009  Hansen et al.
2010/0086764 A1    4/2010  Pepka et al.
2013/0288036 A1*  10/2013  Schulze et al. ............... 428/223

FOREIGN PATENT DOCUMENTS

WO    WO2006-069581    *  7/2006
WO    WO2008013141 A1    1/2008
WO    WO2011/087411    *  7/2011

OTHER PUBLICATIONS

Notice of Reasons for Rejection and English Translation, dated Oct. 18, 2016, regarding Japanese Patent Application No. 2013-031094, 6 pages.
State Intellectual Property Office of PRC, Notification of Third Office Action and English Translation, dated Dec. 14, 2016, Regarding Application No. 201310054185.x, 17 pages.
State Intellectual Property Office of PRC, Notification of the Decision of Rejection and English Translation, dated Mar. 13, 2017, regarding Application No. 201310054185.x, 23 pages.

* cited by examiner

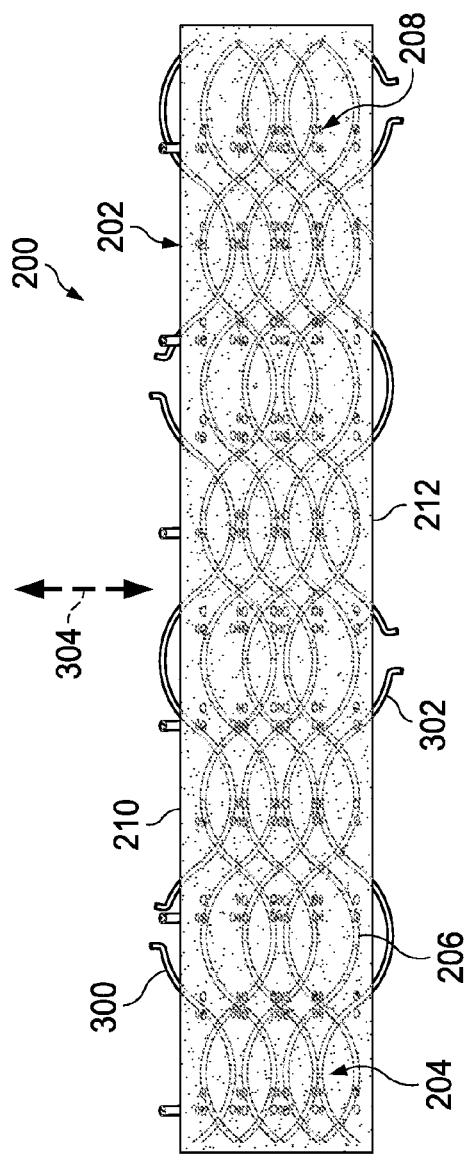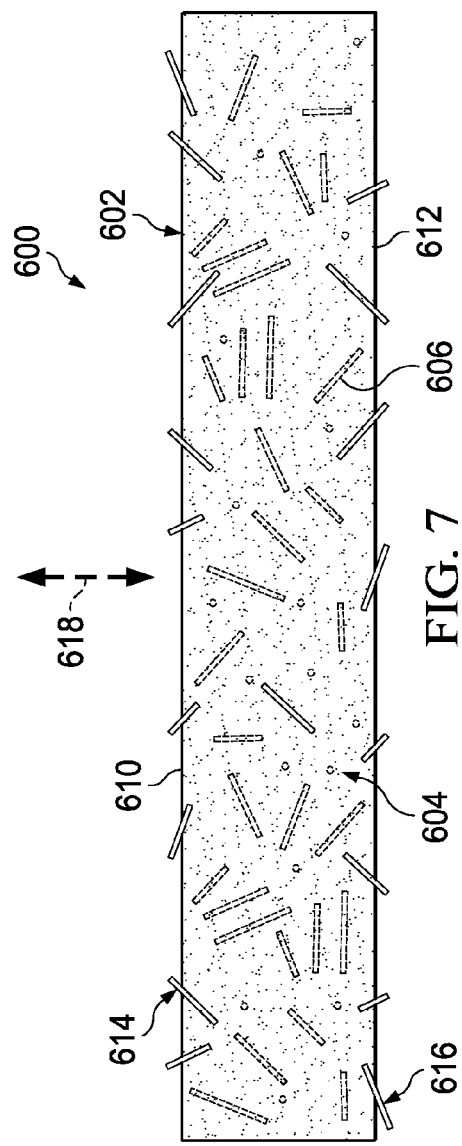

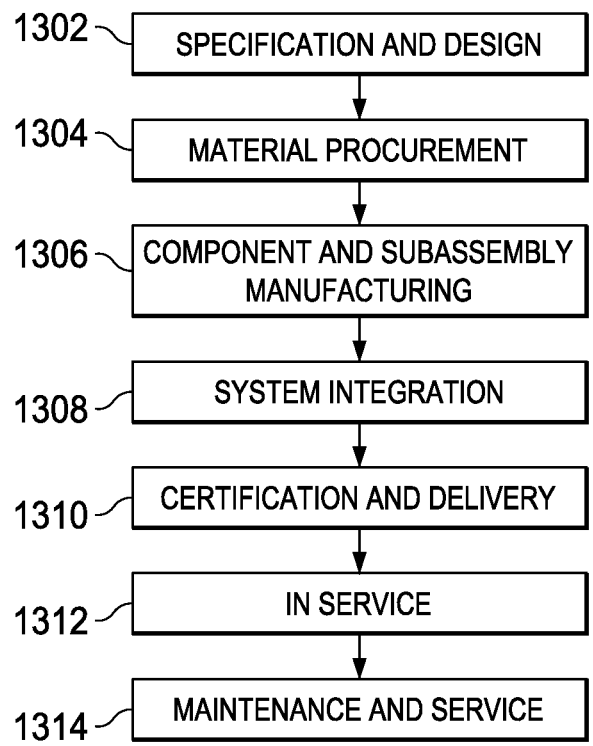
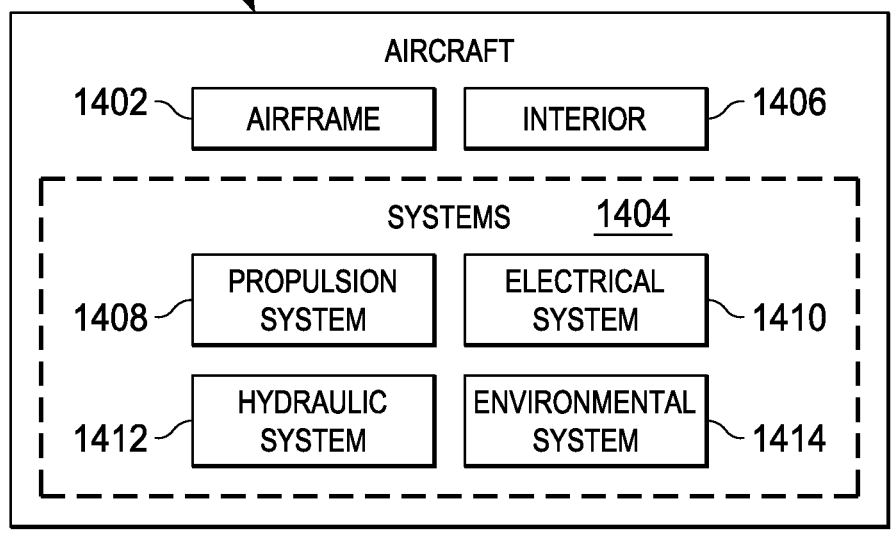

COMPOSITE LAYERS WITH EXPOSED REINFORCEMENT

BACKGROUND INFORMATION

1. Field

The present disclosure relates generally to composite layers and, in particular, to a method and apparatus for conducting electrical energy using composite layers.

2. Background

Composite materials may be used to form structures for different types of objects. As used herein, a "composite material", also referred to as a "composite", comprises two or more different types of materials. These materials have different physical and/or chemical properties which may remain separate and distinct within the composite material.

A structure formed using one or more composite materials is referred to as a composite structure. Composite materials may be used to form composite structures for objects, such as, for example, without limitation, an aerospace vehicle, an unmanned aerial vehicle (UAV), a space shuttle, a watercraft, a land vehicle, an automobile, a building, an electromechanical device, armor, and other suitable types of objects.

In one illustrative example, one or more composite materials may be used to form a composite structure for use in an aircraft. The composite structure may be, for example, a skin panel for a wing or fuselage of the aircraft. A structure formed using composite materials may have an increased strength as compared to the same structure formed using other materials, such as, for example, metal. Further, a structure formed using composite materials may have a reduced weight as compared to the same structure formed using these other materials.

However, in some cases, a composite structure may not provide a desired level of electrical conductivity. For example, a composite structure may be unable to conduct the electrical energy induced in the composite structure by an electromagnetic event that occurs around the composite structure. The electromagnetic event may be, for example, a lightning strike. The electrical energy generated by the electromagnetic event may take the form of electrical currents and/or electromagnetic forces.

As one illustrative example, some currently available composite skin panels for the fuselage of an aircraft are unable to provide a desired number of conductive pathways for the electrical currents and/or electromagnetic forces generated when lightning contacts the fuselage of the aircraft. These electrical currents and/or electromagnetic forces try to find the path of least resistance. In some cases, a portion of the path of least resistance passes through a matrix in a composite skin panel where little conductive material is present. The electrical currents and/or electromagnetic forces cause undesired inconsistencies in the matrix as the electrical currents and/or electromagnetic forces travel along this pathway.

Further, these electrical currents and/or electromagnetic forces may affect the composite structure and/or other components in the aircraft in an undesired manner, while trying to find the path of least resistance. For example, the electrical currents and/or electromagnetic forces may cause the composite structure and/or other components in the aircraft to overheat beyond selected tolerances. The other components that may be affected include, for example, without limitation, the composite skin panel, wiring, hinges, electrical systems, and/or other suitable components in the aircraft. Therefore, it would be desirable to have a method and apparatus that takes into account at least some of the issues discussed above as well as possibly other issues.

SUMMARY

In one illustrative embodiment, an apparatus comprises a matrix and a reinforcement. The matrix comprises a substantially nonconductive material. The reinforcement comprises a conductive material. The reinforcement is located within the matrix to form a composite layer. A portion of the reinforcement is exposed at a surface of the composite layer such that electrical conductivity of the composite layer is increased in a direction substantially perpendicular to the composite layer.

In another illustrative embodiment, a composite structure comprises a plurality of composite layers. A composite layer in the plurality of composite layers comprises a matrix and a reinforcement. The matrix comprises a substantially nonconductive material. The reinforcement comprises a conductive material and is located within the matrix. A portion of the reinforcement is exposed at a surface of the composite layer such that electrical conductivity of the composite layer is increased in a direction substantially perpendicular to the composite layer. The portion of the reinforcement exposed at the surface of the composite layer electrically connects the composite layer to another composite layer in the plurality of composite layers such that the composite structure has a desired level of electrical conductivity in a direction substantially parallel to a z-axis for the composite structure.

In yet another illustrative embodiment, a method for conducting electrical energy using a composite structure is present. An object comprising the composite structure is operated. Electrical energy is induced in the composite structure in response to an electromagnetic event that occurs during operation of the object. The composite structure comprises a plurality of composite layers. A composite layer in the plurality of composite layers comprises a matrix and a reinforcement. The matrix comprises a substantially nonconductive material. The reinforcement comprises a conductive material and is located within the matrix. A portion of the reinforcement is exposed at a surface of the composite layer. The electrical energy induced in the composite structure in response to the electromagnetic event is conducted within the composite structure using the portion of the reinforcement exposed at the surface of the composite layer in the plurality of composite layers such that electrical conductivity of the composite structure is increased in a direction substantially parallel to a z-axis for the composite structure.

In yet another illustrative embodiment, a method for forming a composite layer is present. A reinforcement is embedded in a matrix to form the composite layer. The matrix comprises a substantially nonconductive material. The reinforcement comprises a conductive material. A portion of the reinforcement is exposed at a selected portion of a surface of the composite layer such that electrical conductivity of the composite layer is increased in a direction substantially perpendicular to the composite layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 4 is an illustration of a cross-sectional side view of a composite layer with portions of reinforcement exposed at surfaces of the composite layer in accordance with an illustrative embodiment;

FIG. 7 is an illustration of a cross-sectional side view of a composite layer with portions of reinforcement exposed at surfaces of the composite layer in accordance with an illustrative embodiment;

FIG. 13 is an illustration of an aircraft manufacturing and service method in accordance with an illustrative embodiment; and FIG. 14 is an illustration of an aircraft in which an illustrative embodiment may be implemented.

DETAILED DESCRIPTION

Figure 1:
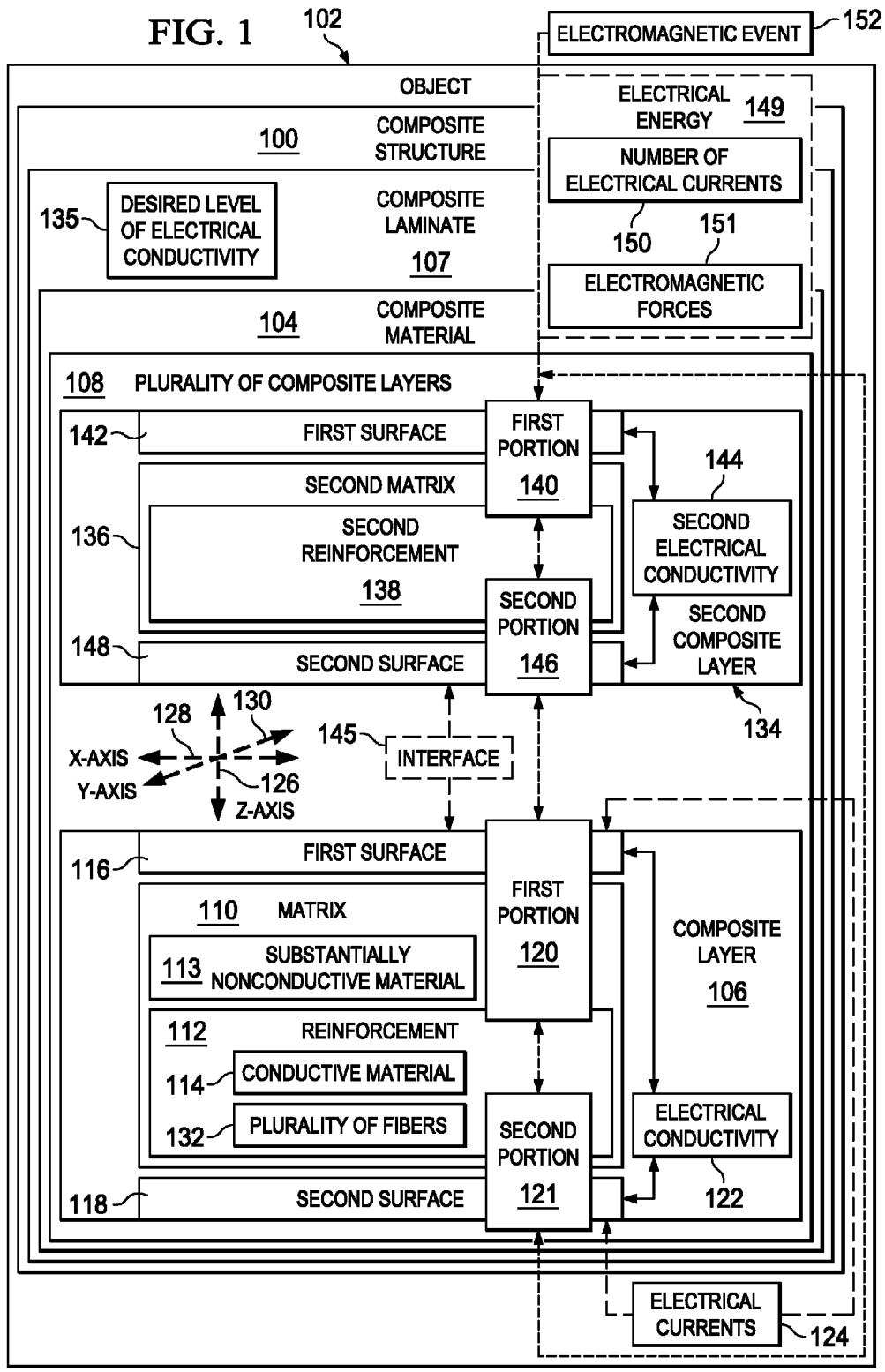
FIG. 1 is an illustration of a composite structure in the form of a block diagram in accordance with an illustrative embodiment.

The different illustrative embodiments recognize and take into account different considerations. For example, the different illustrative embodiments recognize and take into account that some currently available composite structures do not have a desired level of electrical conductivity. In particular, these composite structures may not provide a desired level of electrical conductivity in a direction substantially perpendicular to these composite structures. The direction substantially perpendicular to these composite structures may be a direction substantially parallel to a z-axis for these composite structures.

As one illustrative example, a composite structure may be unable to conduct the electrical currents and/or electromagnetic forces induced in a composite structure in a direction substantially parallel to a z-axis for the composite structure. These electrical currents and/or electromagnetic forces may be induced in the composite structure in response to an electromagnetic event that occurs in an environment around the composite structure. The electromagnetic event is any event that generates electrical currents, electromagnetic forces, and/or produces an electrical field. For example, the electromagnetic event may be a lightning strike, a short circuit, an overloaded circuit, mismatched loads in a circuit, an electrical field, or some other type of electromagnetic event.

The different illustrative embodiments recognize and take into account that a composite structure having an increased electrical conductivity in the direction substantially perpendicular to the composite structure may be desirable for providing a desired level of protection from undesired effects caused by electromagnetic events. These undesired effects include, for example, without limitation, delamination, cracks, tearing, wear, and/or other types of undesired effects with respect to the composite structure.

For example, the different illustrative embodiments recognize and take into account that an increased electrical conductivity with respect to a z-axis for a composite structure may be useful for dissipating the electrical currents and/or electromagnetic forces generated by a lightning strike contacting the composite structure. Further, the different illustrative embodiments recognize and take into account that increasing the electrical conductivity of a composite structure without increasing the weight and/or reducing the strength of the composite structure outside of selected tolerances may be desirable.

Thus, the different illustrative embodiments provide a method and apparatus for conducting electrical energy. In one illustrative embodiment, an apparatus comprises a matrix and a reinforcement. The matrix comprises a substantially nonconductive material. The reinforcement comprises a conductive material. The reinforcement is located within the matrix to form a composite layer. A portion of the reinforcement is exposed at a surface of the composite layer such that electrical conductivity of the composite layer is increased in a direction substantially perpendicular to the composite layer.

In another illustrative embodiment, a composite structure comprises a plurality of composite layers. Each composite layer in the plurality of composite layers comprises a matrix and a reinforcement. The matrix comprises a substantially nonconductive material. The reinforcement comprises a conductive material and is located within the matrix. A first portion of the reinforcement is exposed at a first surface of each composite layer, and a second portion of the reinforcement is exposed at a second surface of each composite layer such that the electrical conductivity of each composite layer is increased in a direction substantially perpendicular to the composite layer. The first portion and the second portion of the reinforcement in each composite layer in the plurality of composite layers is configured to electrically connect the plurality of composite layers to each other such that the composite structure has a desired level of electrical conductivity in a direction substantially perpendicular to the composite structure.

With reference now to the figures and, in particular, with reference now to FIG. 1, an illustration of a composite structure in the form of a block diagram is depicted in accordance with an illustrative embodiment. Composite structure 100 is configured for use in an object, such as, for example, object 102.

Object 102 may take a number of different forms. For example, without limitation, object 102 may be an aerospace vehicle, an unmanned aerial vehicle (UAV), a helicopter, a satellite, a space shuttle, a watercraft, a train, a land vehicle, an automobile, a building, an electromechanical device, armor, or some other suitable type of object. As one illustrative example, when object 102 takes the form of an aerospace vehicle, composite structure 100 may be a skin panel for the aerospace vehicle.

In these illustrative examples, composite structure 100 comprises composite material 104. Composite material 104 takes the form of one or more composite layers, such as composite layer 106. For example, in one illustrative example, composite layer 106 is the only layer of composite material 104 in composite material 104.

In other illustrative examples, composite layer 106 may be one composite layer in a plurality of composite layers, such as plurality of composite layers 108. As used herein, a "plurality of" means two or more. For example, plurality of composite layers 108 means two or more composite layers. In some illustrative examples, a composite layer may also be referred to as a composite ply. Plurality of composite layers 108 may include two, three, four, 10, 20, 50, 100, or some other number of composite layers, depending on the implementation.

As depicted, composite layer 106 comprises matrix 110 and reinforcement 112. Reinforcement 112 is located within matrix 110 to form composite layer 106. In particular, matrix 110 is a monolithic material into which reinforcement 112 is embedded in these illustrative examples. Further, matrix 110 is substantially continuous. In other words, a path may be present from any point in matrix 110 to any other point in matrix 110. Matrix 110 provides support for reinforcement 112. Matrix 110 is sometimes referred to as a binder for reinforcement 112.

In these illustrative examples, matrix 110 comprises substantially nonconductive material 113. Substantially nonconductive material 113 may comprise any number of materials that are substantially nonconductive. In particular, substantially nonconductive material 113 may not have a desired level of conductivity. Further, substantially nonconductive material 113 may be selected to support reinforcement 112.

For example, without limitation, matrix 110 may comprise at least one of a polymer, a plastic, a ceramic material, and some other suitable type of material. In particular, matrix 110 may comprise one or more polymers selected from at least one of, for example, without limitation, a resin, polyester, vinyl ester, epoxy, phenolic, polyimide, polyamide, a polyether ether ketone (PEEK), polypropylene, a polyester thermosetting plastic, and some other suitable type of polymer material that is substantially nonconductive.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Reinforcement 112 comprises one or more materials embedded in matrix 110. Reinforcement 112 is configured to provide structural support and strength for composite layer 106. In some illustrative examples, reinforcement 112 is used to introduce desirable properties into composite layer 106. For example, reinforcement 112 may be used to change the physical properties of composite layer 106. These physical properties may include, for example, without limitation, electrical conductivity, wear resistance, a friction coefficient, thermal conductivity, and other suitable physical properties.

In these illustrative examples, reinforcement 112 is comprised of a number of materials selected from at least one of carbon, glass, silicon carbide, boron, a metallic material, a ceramic material, a metal alloy, a synthetic material, a para-aramid synthetic material, and some other suitable type of material. These materials may take the form of at least one of fibers, flakes, particles, and fillers within reinforcement 112. Depending on the arrangement of these fibers, flakes, particles, and/or fillers in reinforcement 112, reinforcement 112 may be continuous or discontinuous.

In these illustrative examples, reinforcement 112 comprises conductive material 114. Conductive material 114 may be any material configured to conduct an electrical current. Conductive material 114 may be carbon in these illustrative examples. Of course, in other illustrative examples, conductive material 114 may comprise a number of other conductive materials in addition to and/or in place of carbon. Further, in some cases, reinforcement 112 may comprise other materials in addition to conductive material 114.

In one illustrative example, composite structure 100 may be a carbon fiber reinforced plastic (CFRP). Reinforcement 112 in each composite layer in the carbon fiber reinforced plastic comprises carbon fibers, while matrix 110 comprises a plastic material.

As depicted, composite layer 106 has first surface 116 and second surface 118. First portion 120 of reinforcement 112 may be exposed at first surface 116. Further, second portion 121 of reinforcement 112 may be exposed at second surface 118.

As used herein, a portion of reinforcement 112 is "exposed" when that portion is in contact with the environment around reinforcement 112. For example, when first portion 120 of reinforcement 112 is exposed at first surface 116, some other component may come into contact with first portion 120 of reinforcement 112 at first surface 116.

In one illustrative example, reinforcement 112 comprises plurality of fibers 132. In this example, first portion 120 and second portion 121 of plurality of fibers 132 may each include a group of fibers in plurality of fibers 132. This group of fibers may include fibrils. In some cases, a fiber in plurality of fibers 132 that is exposed at first surface 116 may also be exposed at second surface 118.

First portion 120 and/or second portion 121 of reinforcement 112 may be exposed at first surface 116 and/or second surface 118, respectively, using a number of different processes. For example, a mechanical process, a chemical process, a laser surface ablation process, an etching process, a threading process, a stitching process, an abrasion process, a sanding process, a raking process, and/or some other suitable type of process may be used to expose first portion 120 of reinforcement 112 at first surface 116 and/or second portion 121 of reinforcement 112 at second surface 118.

As one illustrative example, first portion 120 of plurality of fibers 132 is exposed at first surface 116 of composite layer 106 by mechanically wearing away a portion of first surface 116 to expose a portion of plurality of fibers 132 near first surface 116. The portion of first surface 116 that is worn away may be a portion of matrix 110 at first surface 116. First surface 116 may be mechanically worn away using, for example, abrasion, mechanical raking, or some other suitable type of process for wearing away and/or roughening a surface.

In another illustrative example, first portion 120 is exposed at first surface 116 by applying a chemical to first surface 116 of composite layer 106. The chemical may chemically remove or dissolve away a portion of first surface 116 to expose first portion 120 of reinforcement 112. In particular, this chemical process may chemically remove or dissolve away a portion of matrix 110 at first surface 116 to expose first portion 120 of reinforcement 112.

In some illustrative examples, a laser is used to ablate or remove a portion of first surface 116 to expose first portion 120 of reinforcement 112. In still other illustrative examples, one or more portions of first surface 116 are etched away to expose first portion 120 of reinforcement 112.

Additionally, in some cases, a group of fibers in plurality of fibers 132 for reinforcement 112 is threaded through matrix 110 such that a first portion of the group of fibers is exposed at first surface 116 while a second portion of the group of fibers remains substantially embedded in matrix 110 in composite layer 106. The different processes described for exposing first portion 120 of reinforcement 112 at first surface 116 of composite layer 106 may be implemented in a similar manner to expose second portion 121 of reinforcement 112 at second surface 118 of composite layer 106.

First portion 120 of reinforcement 112 exposed at first surface 116 increases electrical conductivity 122 of composite layer 106 in a direction substantially perpendicular to composite layer 106. Further, second portion 121 of reinforcement 112 exposed at second surface 118 of composite layer 106 increases electrical conductivity 122 of composite layer 106 in the direction substantially perpendicular to composite layer 106.

Electrical conductivity 122 is a measure of the ability of composite layer 106 to conduct an electrical current. Electrical conductivity 122 of composite layer 106 may be increased at first surface 116 and second surface 118 of composite layer 106 with respect to electrical currents 124 that may flow into and/or out of composite layer 106 at first surface 116 and second surface 118.

Electrical currents 124 may flow into composite layer 106 from any direction relative to composite layer 106. Conductive material 114 of reinforcement 112 allows electrical currents 124 that flow into composite layer 106 from any direction relative to composite layer 106 to be conducted within composite layer 106. Further, electrical currents 124 may flow out of composite layer 106 in any direction relative to composite layer 106.

In some illustrative examples, first portion 120 of reinforcement 112 may be exposed at a selected portion of first surface 116. The portion of first surface 116 at which first portion 120 of reinforcement 112 is exposed may be selected to increase electrical conductivity 122 of composite layer 106 in the direction substantially perpendicular to composite layer 106 at this selected portion of first surface 116 and not at other portions of first surface 116.

Similarly, second portion 121 of reinforcement 112 may be exposed at a selected portion of second surface 118. The portion of second surface 118 at which second portion 121 of reinforcement 112 is exposed may be selected to increase electrical conductivity 122 of composite layer 106 in the direction substantially perpendicular to composite layer 106 at this selected portion of second surface 118 and not at other portions of first surface 116.

The selected portions of first surface 116 and second surface 118 at which reinforcement 112 is exposed may comprise one portion of each of these surfaces or discontinuous portions of each of these surfaces. In some cases, the selected portion for at least one of first surface 116 and second surface 118 may form a pattern on the surface.

Of course, in other cases, the selected portion for at least one of first surface 116 and second surface 118 may be substantially the entire surface. In this manner, electrical conductivity 122 of composite layer 106 in the direction substantially perpendicular to composite layer 106 may be specifically tailored based on, for example, without limitation, a policy, certain requirements, and/or the particular usage for composite structure 100.

When composite structure 100 takes the form of composite laminate 107 with plurality of composite layers 108, a first portion and/or a second portion of the reinforcement in each composite layer in plurality of composite layers 108 may be exposed at the first surface and/or second surface, respectively, of each composite layer. The portions of reinforcement exposed at the first surface and/or the second surface of each composite layer in plurality of composite layers 108 electrically connect plurality of composite layers 108 to each other.

With plurality of composite layers 108 electrically connected to each other, electrical currents 124 are allowed to flow between the different composite layers in plurality of composite layers 108. In particular, the portions of reinforcement exposed at the first surface and/or the second surface of each composite layer in plurality of composite layers 108 increase the ability of composite laminate 107 to conduct electrical currents 124 in a direction substantially perpendicular to composite laminate 107. Consequently, composite laminate 107 has an increased electrical conductivity 122 with respect to the direction substantially perpendicular to composite laminate 107.

In this manner, the exposed portions of reinforcement for the different composite layers in plurality of composite layers 108 may provide desired level of electrical conductivity 135 for composite laminate 107 in the direction substantially perpendicular to composite laminate 107. Further, with the portions of reinforcement exposed at the first surface and/or second surface of each composite layer in plurality of composite layers 108, additional layers between the different composite layers in plurality of composite layers 108 may not be needed to provide desired level of electrical conductivity 135.

Depending on the implementation, not all of the composite layers in plurality of composite layers 108 may have reinforcement exposed at both surfaces of the composite layers. In some cases, only a portion of the composite layers in plurality of composite layers 108 has reinforcement exposed at both surfaces. Further, in other examples, a portion of the composite layers in plurality of composite layers 108 has reinforcement exposed at only one surface.

Any reinforcement exposed at the surface of a composite layer in plurality of composite layers 108 may increase the electrical conductivity of composite laminate 107 in the direction substantially perpendicular to composite laminate 107. Further, depending on the type and/or configuration of the reinforcement in each of plurality of composite layers 108, an increased electrical conductivity of composite laminate 107 in the direction substantially perpendicular to composite laminate 107 may increase the electrical conductivity of composite laminate 107 in any number of other directions with respect to composite laminate 107.

In these illustrative examples, the direction that is substantially perpendicular to composite laminate 107 may be a direction substantially parallel to z-axis 126 for composite laminate 107. Z-axis 126 is an axis that is substantially perpendicular to x-axis 128 and y-axis 130 for composite laminate 107. In these illustrative examples, x-axis 128 and y-axis 130 lie along the plane through composite laminate 107.

In one illustrative example, composite layer 106 may be a first composite layer in plurality of composite layers 108. Matrix 110 and reinforcement 112 may be a first matrix and a first reinforcement, respectively. Further, electrical conductivity 122 for composite layer 106 may be a first electrical conductivity.

Plurality of composite layers 108 may also include second composite layer 134 comprising second matrix 136 and second reinforcement 138. Second reinforcement 138 may be embedded in second matrix 136. In this illustrative example, first portion 140 of second reinforcement 138 may be exposed at first surface 142 of second composite layer 134 such that second electrical conductivity 144 of second composite layer 134 is increased in the direction substantially perpendicular to second composite layer 134.

Further, second portion 146 of second reinforcement 138 may be exposed at second surface 148 of second composite layer 134 such that second electrical conductivity 144 of second composite layer 134 is increased in the direction substantially perpendicular to second composite layer 134. In these illustrative examples, first portion 140 and/or second portion 146 of second reinforcement 138 may be exposed at first surface 142 and/or second surface 148, respectively, using any of the processes described above for exposing first portion 120 and second portion 121 of reinforcement 112.

As depicted, second composite layer 134 may be positioned relative to composite layer 106. In particular, second composite layer 134 may be laid up over composite layer 106. When second composite layer 134 is positioned relative to composite layer 106, first portion 120 of reinforcement 112 may contact second portion 146 of second reinforcement 138 at interface 145 between first surface 116 of composite layer 106 and second surface 148 of second composite layer 134.

This contact may electrically connect composite layer 106 to second composite layer 134 at interface 145. In these illustrative examples, this contact increases the electrical conductivity of plurality of composite layers 108 in the direction substantially parallel to z-axis 126 to provide desired level of electrical conductivity 135 for plurality of composite layers 108.

In some cases, first portion 120 of reinforcement 112 may be near second portion 146 of second reinforcement 138 when second composite layer 134 is positioned relative to composite layer 106 but may not come into contact with second portion 146. First portion 120 may be near enough to second portion 146 to allow electrical currents 124 to flow between first portion 120 and second portion 146. In other words, in some illustrative examples, first portion 120 may not need to be in direct contact with second portion 146 to allow electrical currents 124 to flow between first portion 120 and second portion 146.

For example, electrical energy 149 may be induced in composite structure 100 in response to electromagnetic event 152. Electromagnetic event 152 may be, for example, without limitation, a lightning strike, a short circuit, an overloaded circuit, mismatched loads in a circuit, an electrical field near composite structure 100, or some other suitable type of event that generates number of electrical currents 150.

Electrical energy 149 is induced in composite structure 100 in the form of number of electrical currents 150 and/or electromagnetic forces 151. In these illustrative examples, electromagnetic event 152 induces electrical energy 149 in composite structure 100 by generating number of electrical currents 150 that flow into composite structure 100, inducing an electrical field within composite structure 100, and/or inducing electrical energy 149 in composite structure 100 in some other suitable manner.

In one illustrative example, electromagnetic event 152 occurs above first surface 142 of second composite layer 134. For example, lightning contacts first surface 142 of second composite layer 134. In particular, lightning contacts first portion 140 of second reinforcement 138 when lightning contacts first surface 142. This lightning strike generates number of electrical currents 150 that are conducted into second composite layer 134.

Number of electrical currents 150 flow into second composite layer 134 through first portion 140 of second reinforcement 138 at first surface 142 of second composite layer 134. Number of electrical currents 150 flow through composite layer 134 in the direction substantially parallel to z-axis 126.

Further, number of electrical currents 150 flow out of second composite layer 134 through second portion 146 of second reinforcement 138 at second surface 148 of second composite layer 134 and into composite layer 106 through first portion 120 of reinforcement 112 at first surface 116 of composite layer 106. Number of electrical currents 150 flow through composite layer 106 in the direction substantially parallel to z-axis 126. In some cases, number of electrical currents 150 flow out of composite layer 106 though second portion 121 of reinforcement 112 and into some other composite layer under composite layer 106 in composite structure 100.

Further, in addition to number of electrical currents 150 flowing in the direction substantially parallel to z-axis 126, number of electrical currents 150 may also be conducted within composite layer 106 and second composite layer 134 in any number of other directions relative to these composite layers. In some cases, increased electrical conductivity 122 and second electrical conductivity 144 in the direction substantially parallel to z-axis 126 increase electrical conductivity 122 and second electrical conductivity 144 in other directions.

In this manner, the physical proximity of first portion 140 and second portion 146 of second reinforcement 138 in second composite layer 134 and first portion 120 and second portion 121 of reinforcement 112 in composite layer 106 may provide conductive pathways for number of electrical currents 150. These conductive pathways provide desired level of electrical conductivity 135 for composite structure 100. Desired level of electrical conductivity 135 may be a higher electrical conductivity in the direction substantially perpendicular to composite structure 100 as compared to currently available composite structures.

The illustration of composite structure 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some cases, plurality of composite layers 108 may include other composite layers in addition to composite layer 106 and second composite layer 134. Further, in some illustrative examples, composite layer 106 may include other materials in addition to matrix 110 and reinforcement 112.

In other illustrative examples, additional conductive material may be applied between composite layers in plurality of composite layers 108. This additional conductive material may be used to increase the electrical conductivity of composite structure 100 in the direction substantially parallel to z-axis 126. The conductive material applied between the composite layers may include, for example, without limitation, metal particles, chopped carbon fibers, carbon flakes, carbon particles, and/or other suitable types of conductive material.

Figure 2:
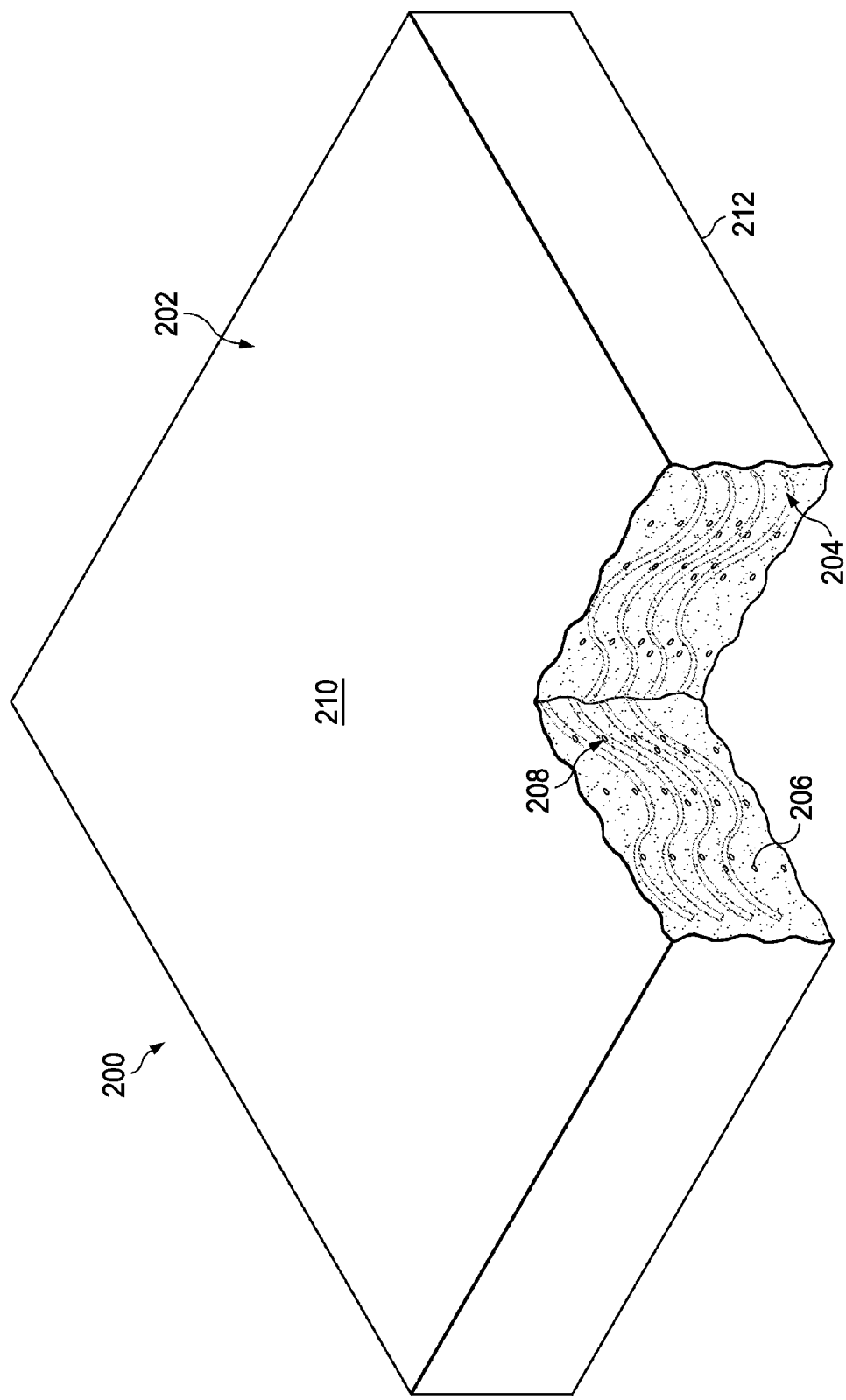
FIG. 2 is an illustration of a partially-exposed isometric view of a composite layer in accordance with an illustrative embodiment.

With reference now to FIG. 2, an illustration of a partially-exposed isometric view of a composite layer is depicted in accordance with an illustrative embodiment. In this illustrative example, composite layer 200 is an example of one implementation for composite layer 106 in FIG. 1. As depicted, composite layer 200 comprises matrix 202 and reinforcement 204. Reinforcement 204 comprises plurality of fibers 206. As depicted, plurality of fibers 206 may be arranged in the form of mesh 208.

Further, composite layer 200 has first surface 210 and second surface 212. In this illustrative example, portions of reinforcement 204 have not yet been exposed at first surface 210 and second surface 212. In particular, fibrils and/or fibers in plurality of fibers 206 are not in contact with first surface 210 or second surface 212 in this depicted example.

Composite layer 200 in FIG. 2 may be an example of a composite layer before fibers in plurality of fibers 206 have been exposed. A portion of plurality of fibers 206 near first surface 210 and a portion of plurality of fibers 206 near second surface 212 may be exposed using, for example, without limitation, a mechanical process, a laser process, a chemical process, or some other suitable type of process.

Figure 3:
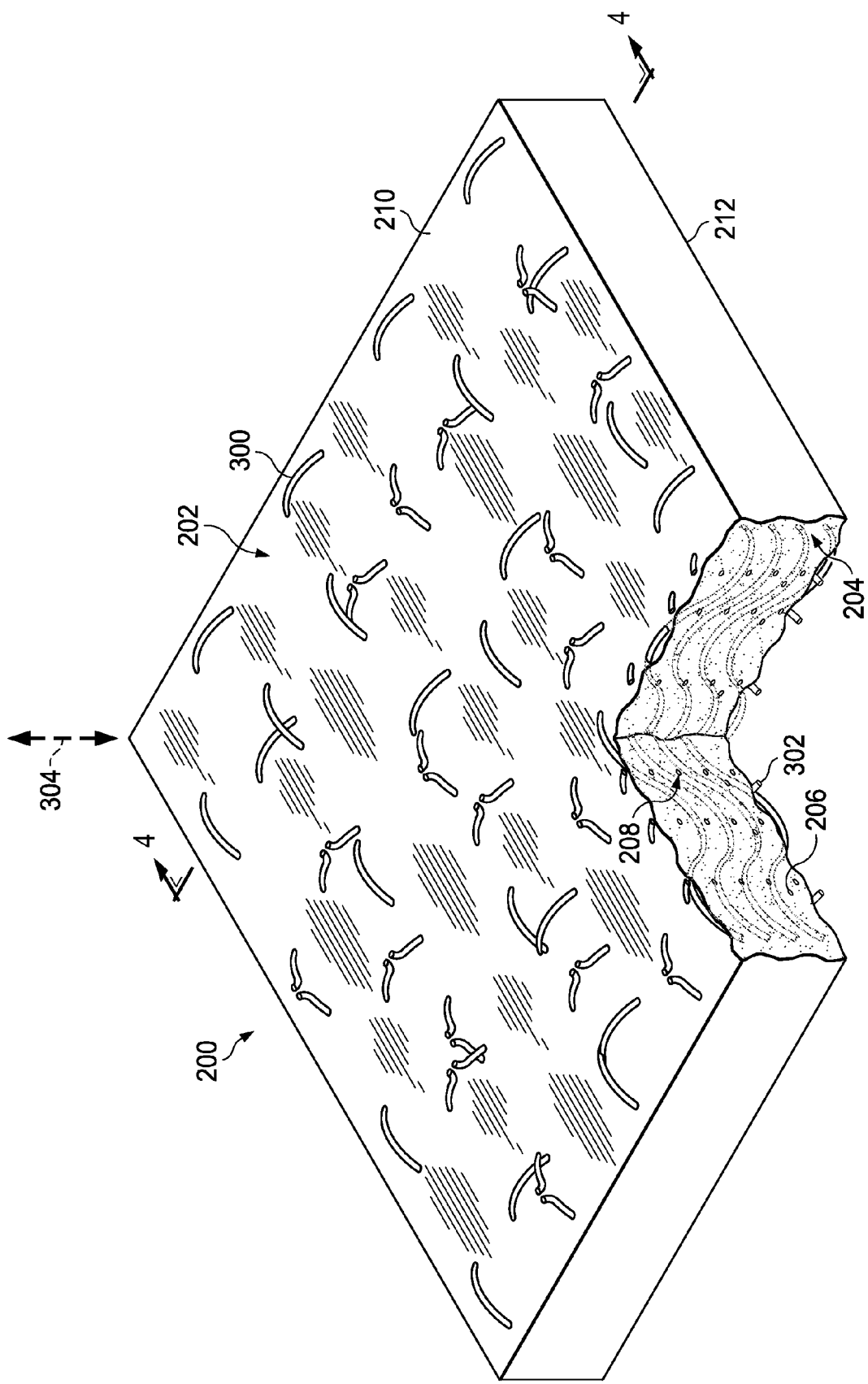
FIG. 3 is an illustration of a partially-exposed isometric view of a composite layer with portions of reinforcement exposed at surfaces of the composite layer in accordance with an illustrative embodiment.

With reference now to FIG. 3, an illustration of a partially-exposed isometric view of a composite layer with portions of reinforcement exposed at surfaces of the composite layer is depicted in accordance with an illustrative embodiment. In this illustrative example, first surface 210 and second surface 212 of composite layer 200 have been roughened such that first portion 300 of reinforcement 204 is exposed at first surface 210, and second portion 302 of reinforcement 204 is exposed at second surface 212.

First surface 210 and second surface 212 may have been roughened using a number of different processes as described in FIG. 1. For example, first surface 210 and second surface 212 may have been roughened using at least one of an abrasion process, a raking process, or some other suitable type of mechanical process.

As depicted, first portion 300 and second portion 302 may include broken ends of fibers in plurality of fibers 206 in reinforcement 204, loops of fibers in plurality of fibers 206, and other portions or pieces of fibers in plurality of fibers 206. First portion 300 of reinforcement 204 exposed at first surface 210 and second portion 302 of reinforcement 204 exposed at second surface 212 increase the electrical conductivity of composite layer 200 in a direction substantially parallel to z-axis 304.

With reference now to FIG. 4, an illustration of a cross-sectional side view of a composite layer with portions of reinforcement exposed at surfaces of the composite layer is depicted in accordance with an illustrative embodiment. In this illustrative example, a cross-sectional side view of composite layer 200 taken along lines 4-4 in FIG. 3 is depicted.

Figure 5:
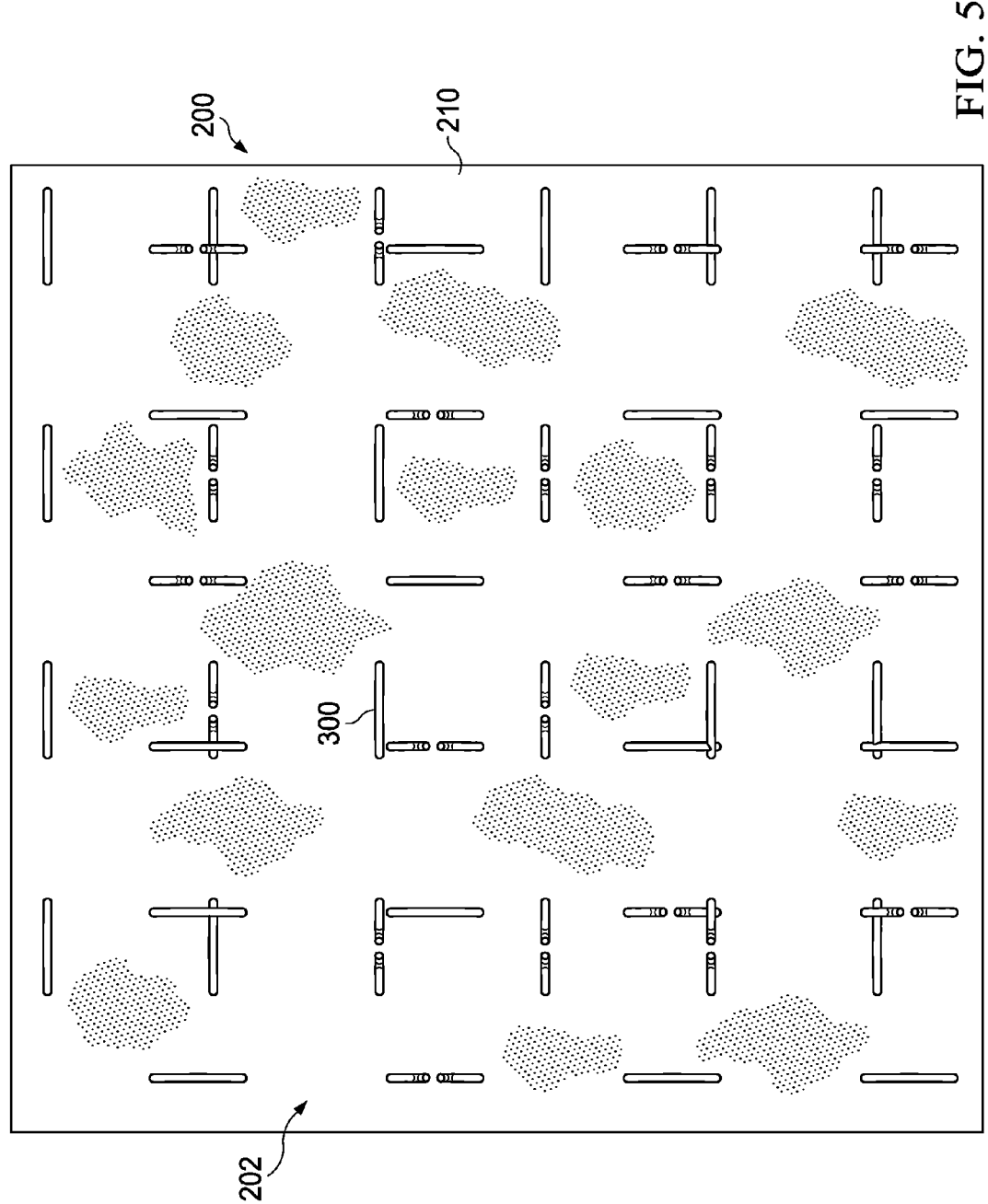
FIG. 5 is an illustration of a top view of a composite layer with portions of reinforcement exposed at surfaces of the composite layer in accordance with an illustrative embodiment.

Turning now to FIG. 5, an illustration of a top view of a composite layer with portions of reinforcement exposed at surfaces of the composite layer is depicted in accordance with an illustrative embodiment. In this illustrative example, a top view of composite layer 200 from FIG. 3 is depicted.

Figure 6:
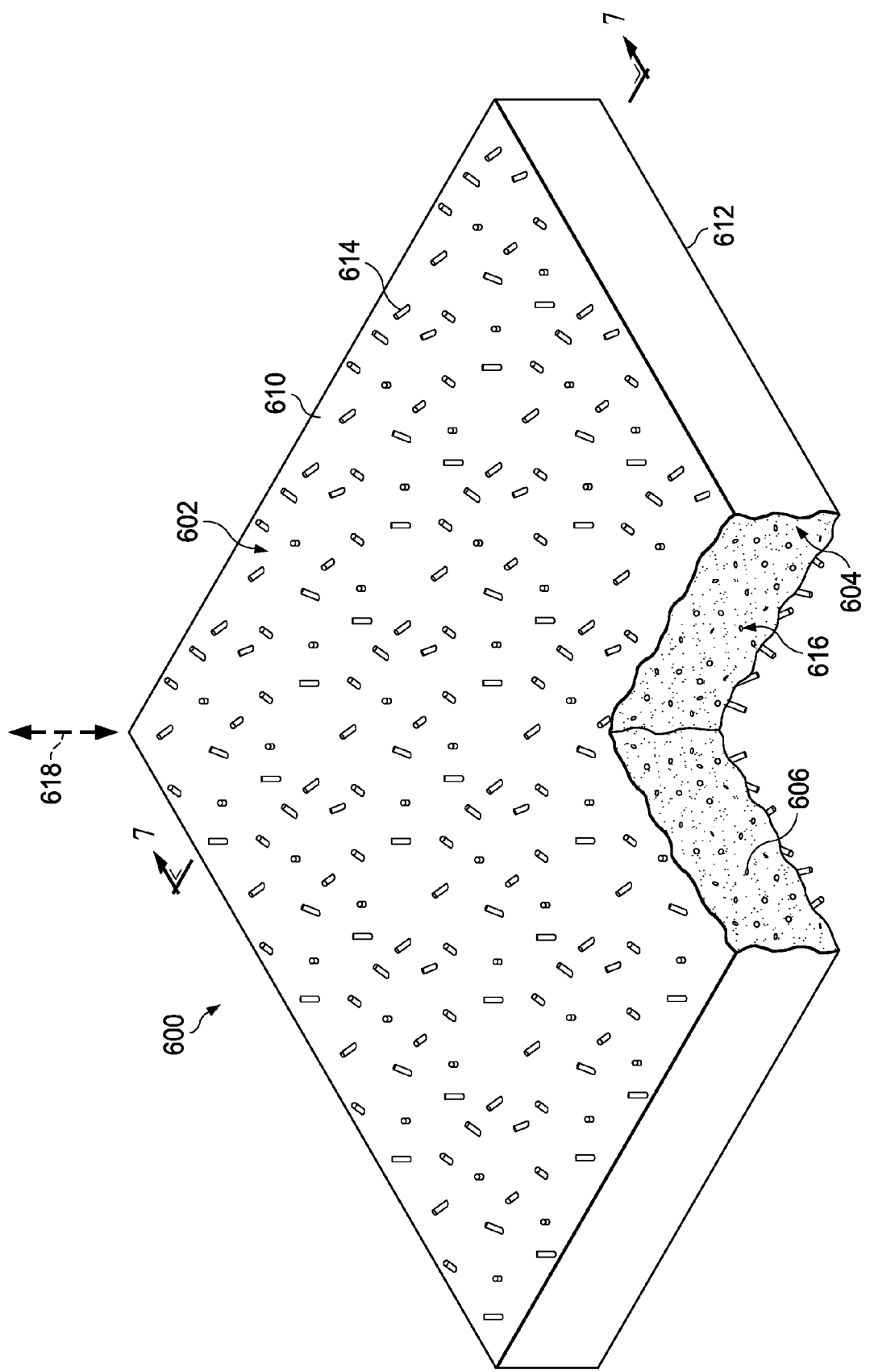
FIG. 6 is an illustration of a partially-exposed isometric view of a composite layer with portions of reinforcement exposed at surfaces of the composite layer in accordance with an illustrative embodiment.

With reference now to FIG. 6, an illustration of a partially-exposed isometric view of a composite layer with portions of reinforcement exposed at surfaces of the composite layer is depicted in accordance with an illustrative embodiment. In this illustrative example, composite layer 600 is an example of one implementation for composite layer 106 in FIG. 1.

As depicted, composite layer 600 comprises matrix 602 and reinforcement 604. Reinforcement 604 comprises plurality of fibers 606. As depicted, plurality of fibers 606 is not arranged in a mesh, such as mesh 208 in FIGS. 2-4. Instead, plurality of fibers 606 may have a random arrangement within reinforcement 604.

Further, composite layer 600 has first surface 610 and second surface 612. In this illustrative example, a portion of first surface 610 and a portion of second surface 612 have been removed such that first portion 614 of reinforcement 604 is exposed at first surface 610 and second portion 616 of reinforcement 604 is exposed at second surface 612.

First portion 614 and second portion 616 may be exposed using a number of different processes. For example, a portion of first surface 610 and a portion of second surface 612 may have been removed using a chemical process, a laser ablation process, or some other suitable type of process to expose first portion 614 and second portion 616.

As depicted, first portion 614 and second portion 616 may include broken ends of fibers in plurality of fibers 606 in reinforcement 604, loops of fibers in plurality of fibers 606, and other portions or pieces of fibers in plurality of fibers 606. First portion 614 of reinforcement 604 exposed at first surface 610 and second portion 616 of reinforcement 604 exposed at second surface 612 increase the electrical conductivity of composite layer 600 in a direction substantially parallel to z-axis 618.

With reference now to FIG. 7, an illustration of a cross-sectional side view of a composite layer with portions of reinforcement exposed at surfaces of the composite layer is depicted in accordance with an illustrative embodiment. In this illustrative example, a cross-sectional side view of composite layer 600 taken along lines 7-7 in FIG. 6 is depicted.

Figure 8:
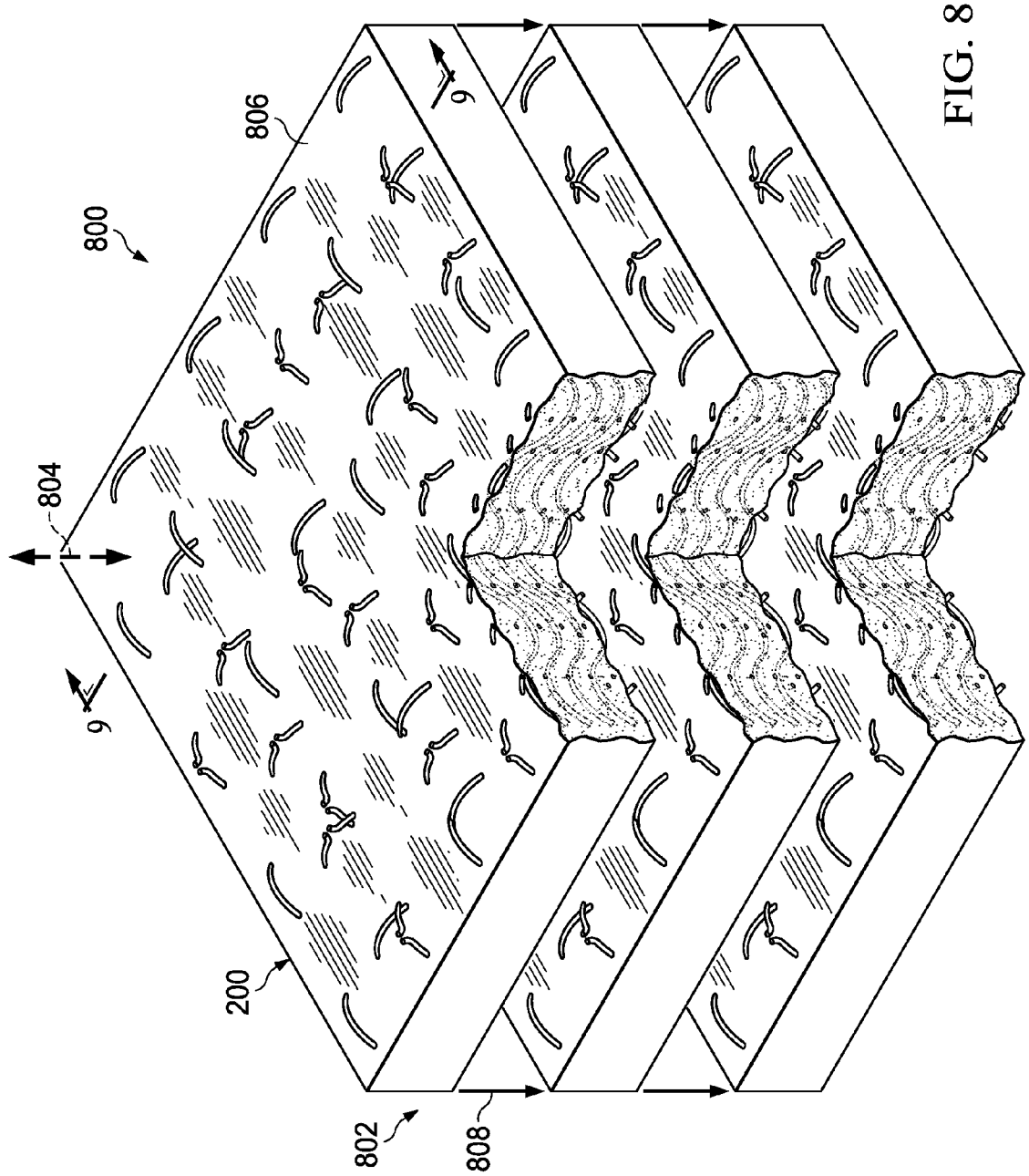
FIG. 8 is an illustration of a partially-exposed isometric view of a composite structure comprising a plurality of composite layers in accordance with an illustrative embodiment.

With reference now to FIG. 8, an illustration of a partially-exposed isometric view of a composite structure comprising a plurality of composite layers is depicted in accordance with an illustrative embodiment. In this illustrative example, composite structure 800 may be a skin panel for an aircraft. As depicted, composite structure 800 comprises plurality of composite layers 802. Consequently, composite structure 800 may be referred to as a composite laminate.

Each composite layer in plurality of composite layers 802 may be implemented using composite layer 200 from FIG. 3. In this manner, conductive pathways may be formed by contact between the exposed portions of reinforcement at the surfaces of the different composite layers in composite structure 800.

These exposed portions of reinforcement at the surfaces of the different composite layers in composite structure 800 increase the electrical conductivity of composite structure 800 in a direction substantially perpendicular to composite structure 800. This direction may be substantially parallel to z-axis 804 for composite structure 800.

The conductive pathways provided by the exposed portions of reinforcement at the surfaces of the different composite layers in composite structure 800 may allow a number of electrical currents and/or electromagnetic forces generated by an electromagnetic event to be conducted within composite structure 800. The electromagnetic event may be, for example, without limitation, a lightning strike.

When lightning strikes composite structure 800, the lightning may generate electrical currents that are dispersed through composite structure 800 in a direction substantially parallel to z-axis 804. For example, when lightning strikes any surface of composite structure 800, electrical currents may flow into composite structure 800. These electrical currents may be conducted within composite structure 800 through the reinforcement in each of plurality of composite layers 802.

As one specific example, when lightning strikes surface 806 of composite structure 800, electrical currents may flow through plurality of composite layers 802 in the direction of arrow 808. In particular, plurality of composite layers 802 may conduct these electrical currents in the direction of arrow 808 to disperse these electrical currents.

Figure 9:
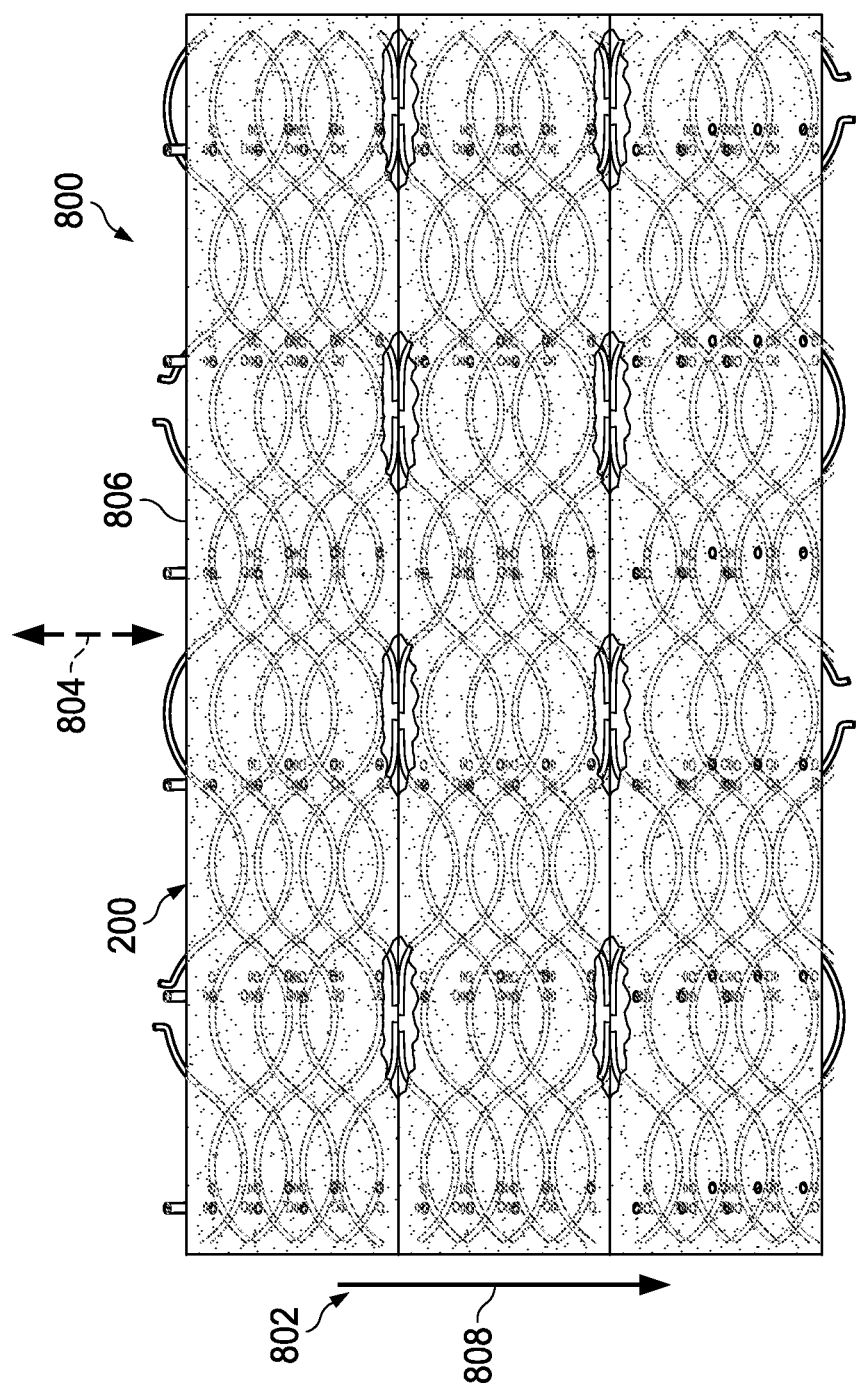
FIG. 9 is an illustration of a cross-sectional side view of a composite structure comprising a plurality of composite layers in accordance with an illustrative embodiment.

With reference now to FIG. 9, an illustration of a cross-sectional side view of a composite structure comprising a plurality of composite layers is depicted in accordance with an illustrative embodiment. In FIG. 9, a cross-sectional side view of composite structure 800 taken along lines 9-9 in FIG. 8 is depicted.

The different components shown in FIGS. 2-9 may be combined with components in FIG. 1, used with components in FIG. 1, or a combination of the two. Additionally, some of the components in these figures may be illustrative examples of how components shown in block form in FIG. 1 can be implemented as physical structures.

Figure 10:
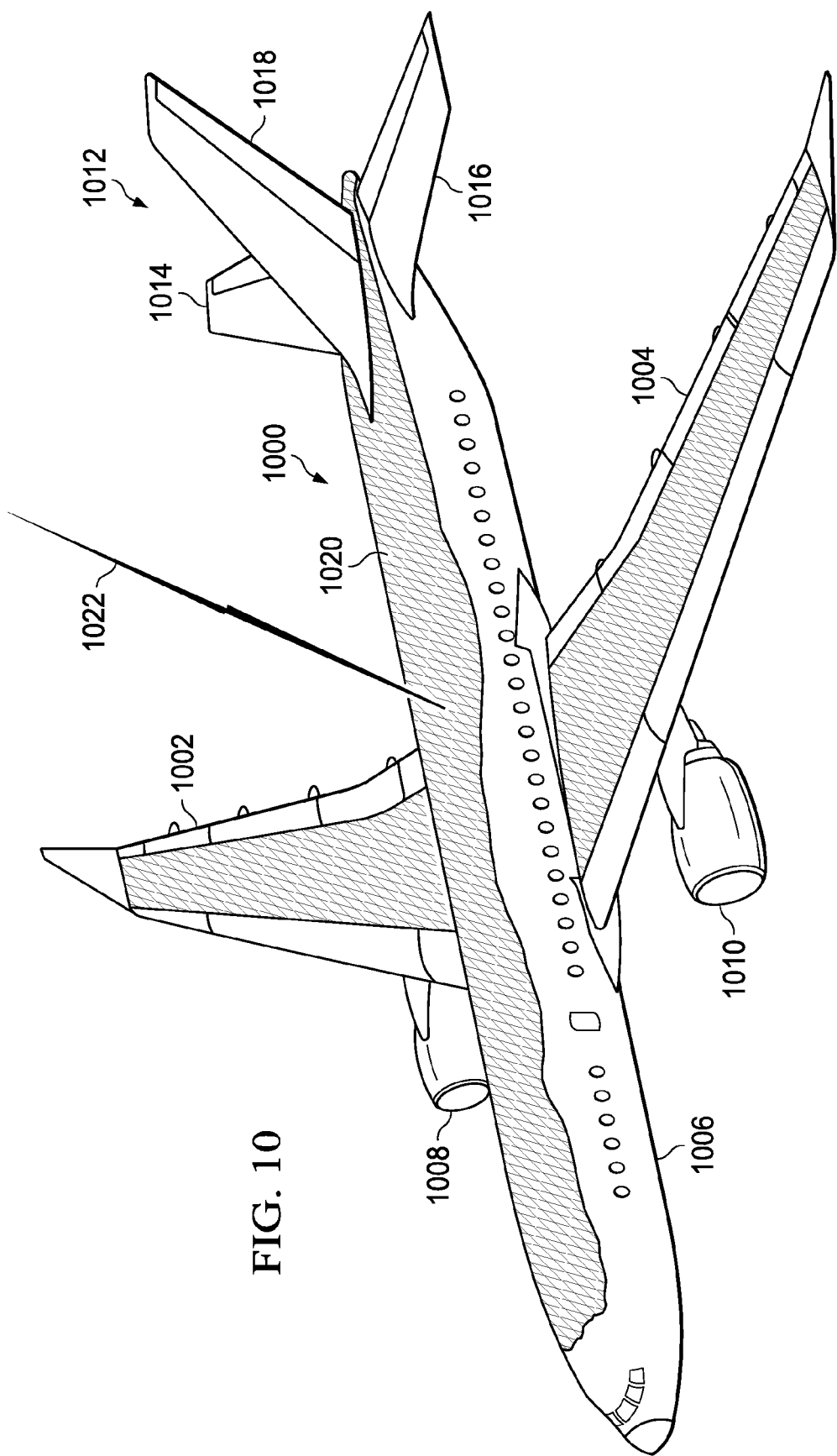
FIG. 10 is an illustration of an aircraft comprising composite skin panels in accordance with an illustrative embodiment.

With reference now to FIG. 10, an illustration of an aircraft comprising composite skin panels is depicted in accordance with an illustrative embodiment. In this illustrative example, aircraft 1000 has wing 1002 and wing 1004 attached to body 1006. Aircraft 1000 includes engine 1008 attached to wing 1002 and engine 1010 attached to wing 1004. Body 1006 has tail section 1012. Horizontal stabilizer 1014, horizontal stabilizer 1016, and vertical stabilizer 1018 are attached to tail section 1012 of body 1006.

Aircraft 1000 is an example of one implementation for object 102 in FIG. 1. Body 1006 of aircraft 1000 may have plurality of composite skin panels 1020. Each composite skin panel in plurality of composite skin panels 1020 may be an example of one implementation for composite structure 100 in FIG. 1. Further, each composite skin panel in plurality of composite skin panels 1020 may be implemented using, for example, composite structure 800 in FIG. 8.

Plurality of composite skin panels 1020 may be configured to conduct electrical energy generated in response to an electromagnetic event. For example, when lightning 1022 strikes body 1006 of aircraft 1000, lightning 1022 encounters plurality of composite skin panels 1020. Plurality of composite skin panels 1020 is configured to conduct the electrical currents and/or electromagnetic forces generated by lightning 1022. In this manner, plurality of composite skin panels 1020 may provide protection from lightning 1022 and other types of electromagnetic events.

Figure 11:
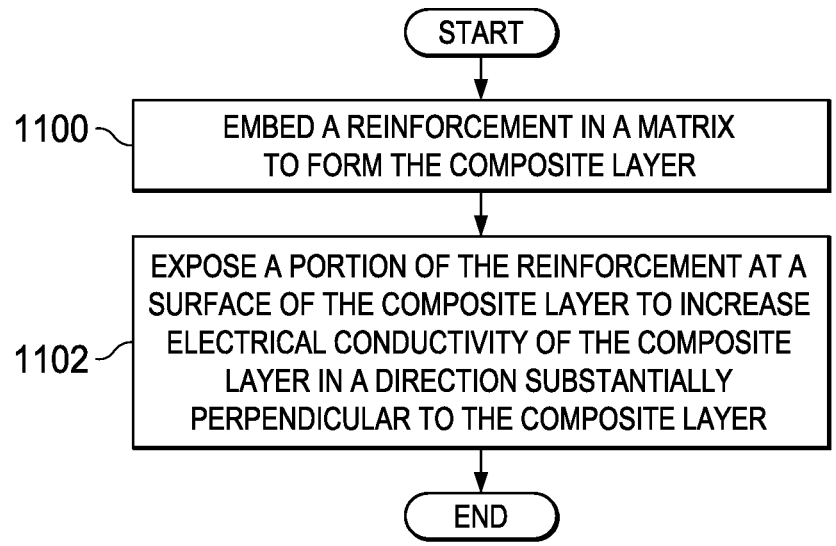
FIG. 11 is an illustration of a process for forming a composite layer in the form of a flowchart in accordance with an illustrative embodiment.

Turning now to FIG. 11, an illustration of a process for forming a composite layer is depicted in the form of a flowchart in accordance with an illustrative embodiment. The process illustrated in FIG. 11 may be used to form composite layer 106 in FIG. 1.

The process begins by embedding a reinforcement in a matrix to form the composite layer (operation 1100). The reinforcement comprises a conductive material. In some illustrative examples, the conductive material may be carbon in the form of a plurality of fibers.

In operation 1100, embedding the reinforcement in the matrix causes the reinforcement to be located within the matrix. In one illustrative example, when the reinforcement is embedded in the matrix, no portion of the reinforcement is exposed at any of the surfaces of the composite layer. The reinforcement may be embedded in the matrix in a number of different ways. For example, without limitation, the reinforcement may be embedded in the matrix using a resin bath process, a chemical vapor deposition process, a vacuum deposition process, a chemical solution deposition process, a chemical bath deposition process, or some other suitable type of process for embedding the reinforcement within the matrix.

The process then exposes a portion of the reinforcement at a surface of the composite layer to increase electrical conductivity of the composite layer in a direction substantially perpendicular to the composite layer (operation 1102), with the process terminating thereafter. In some illustrative examples, operation 1102 may be performed a first time for a first surface of the composite layer and a second time for a second surface of the composite layer.

Operation 1102 may be performed in a number of different ways. For example, operation 1102 may be performed by roughening the surface of the composite layer to pull the portion of the reinforcement embedded in the matrix out of the composite layer through the surface. In another illustrative example, operation 1102 may be performed by applying a chemical to the surface of the composite layer to chemically remove a portion of the matrix at the surface of the composite layer to expose the portion of the reinforcement.

In still other illustrative examples, operation 1102 may be performed by removing a portion of the surface of the composite layer to expose the portion of the reinforcement using a laser ablation process. In some cases, operation 1102 may be performed by threading a group of fibers in a plurality of fibers that form the reinforcement through the composite layer such that a first portion of the group of fibers is exposed at the surface of the composite layer and a second portion of the group of fibers remains substantially embedded in the matrix in the composite layer.

Figure 12:
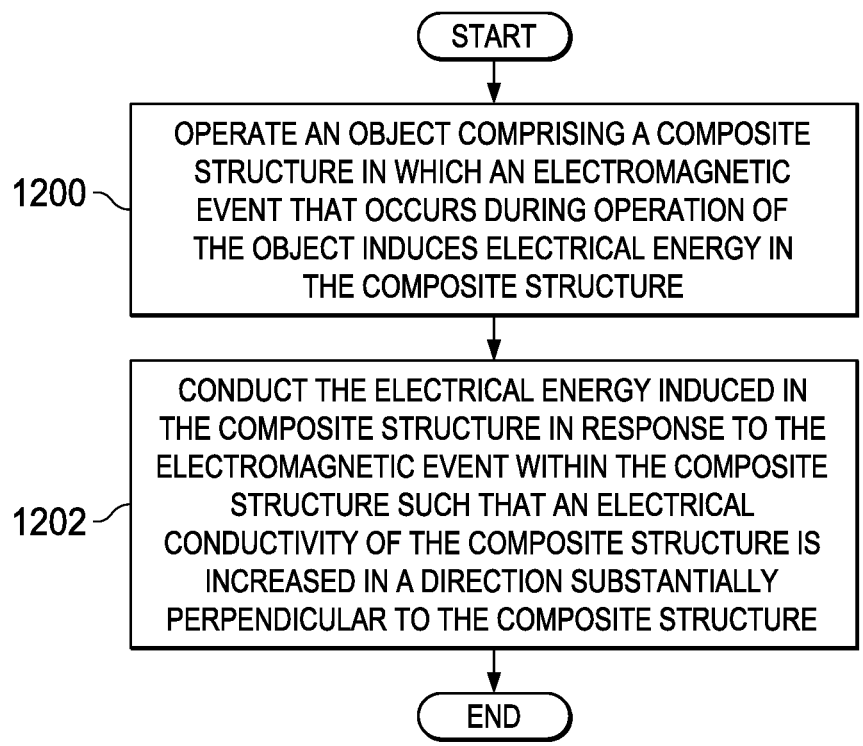
FIG. 12 is an illustration of a process for conducting electrical energy using a composite structure in the form of a flowchart in accordance with an illustrative embodiment.

With reference now to FIG. 12, an illustration of a process for conducting electrical energy using a composite structure in the form of a flowchart is depicted in accordance with an illustrative embodiment. The process illustrated in FIG. 12 may be implemented using composite structure 100 in FIG. 1.

The process begins by operating an object comprising a composite structure in which an electromagnetic event that occurs during operation of the object induces electrical energy in the composite structure (operation 1200). The composite structure may be, for example, composite structure 100 in FIG. 1. This composite structure may be implemented in the form of, for example, composite structure 800 in FIG. 8.

The composite structure comprises a plurality of composite layers. A composite layer in the plurality of composite layers may comprise a matrix and a reinforcement. The reinforcement may comprise a conductive material and is embedded in the matrix. A first portion of the reinforcement is exposed at a first surface of the composite layer, and a second portion of the reinforcement is exposed at a second surface of the composite layer to increase an electrical connectivity of the composite layer at the first surface and the second surface, respectively, of the composite layer.

In this illustrative example, the electromagnetic event may be, for example, a lightning strike, a short circuit, an overloaded circuit, or some other suitable type of event configured to generate electrical energy at a surface of the composite structure. The electrical energy may take the form of a number of electrical currents and/or electromagnetic forces.

The process conducts the electrical energy induced in the composite structure in response to the electromagnetic event within the composite structure such that electrical conductivity of the composite structure is increased in a direction substantially perpendicular to the composite structure (operation 1202), with the process terminating thereafter. In particular, contact between the portions of the reinforcements for the different composite layers exposed at the surfaces of the composite layers in the plurality of composite layers provides conductive pathways for the electrical energy to be conducted.

The flowcharts and block diagrams in the different depicted embodiments illustrate the architecture, functionality, and operation of some possible implementations of the apparatuses and methods in an illustrative embodiment. In this regard, each block in the flowcharts or block diagrams may represent a module, segment, function, and/or a portion of an operation or step. For example, one or more of the blocks may be implemented as program code, in hardware, or as a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry, the marine industry, the energy industry, the construction industry, or some other suitable type of industry.

Apparatuses and methods embodied herein may be employed during at least one of the stages of aircraft manufacturing and service method 1300 in FIG. 13. For example, without limitation, composite structure 100 from FIG. 1 may be designed, manufactured, and implemented in aircraft 1400 in FIG. 14 during at least one of specification and design 1302, material procurement 1304, component and subassembly manufacturing 1306, system integration 1308, in service 1312, and/or maintenance and service 1314. For example, composite structure 100 in FIG. 1 may be used to implement a plurality of skin panels for aircraft 1400 in FIG. 14.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13.

As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312 and/or during maintenance and service 1314 in FIG. 13. The use of a number of the different illustrative embodiments may provide protection for aircraft 1400 from electromagnetic events, such as, for example, without limitation, lightning strikes.

Thus, the different illustrative embodiments provide a method and apparatus for conducting electrical energy. In one illustrative embodiment, an apparatus comprises a matrix and a reinforcement. The matrix comprises a nonconductive material. The reinforcement comprises a conductive material. The reinforcement is located within the matrix to form a composite layer. A portion of the reinforcement is exposed at a surface of the composite layer such that electrical conductivity of the composite layer is increased in a direction substantially perpendicular to the composite layer.

Further, this composite layer may be one composite layer in a plurality of composite layers for a composite structure. Each of the plurality of composite layers for the composite structure may be implemented in a manner similar to the composite layer described above. In particular, a first portion of the reinforcement is exposed at a first surface of each composite layer to increase electrical conductivity of each composite layer at the first surface of each composite layer.

A second portion of the reinforcement is exposed at a second surface of each composite layer to increase the electrical conductivity of each composite layer at the second surface of each composite layer. The first portion and the second portion of the reinforcement in each composite layer in the plurality of composite layers is configured to electrically connect the plurality of composite layers to each other such that the composite structure has a desired level of electrical conductivity in a direction substantially perpendicular to the composite structure.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A skin panel for an aerospace vehicle comprising:
   a first composite layer of the skin panel, the first composite layer comprising:
      a first matrix comprising a substantially nonconductive material;
      a first reinforcement comprising a conductive material, wherein the first reinforcement is transversely located within the first matrix perpendicular to a z-axis for the first composite layer to form the first composite layer in the skin panel in which a first portion of the first reinforcement is exposed at a first surface of the first composite layer such that a first electrical conductivity of the first composite layer is increased in a direction substantially perpendicular to the first composite layer; and
   a second composite layer of the skin panel, the second composite layer comprising
      a second matrix;
      a second reinforcement transversely located within the second matrix perpendicular to a z-axis for the second composite layer, wherein the second matrix and the second reinforcement form the second composite layer in which a second portion of the second reinforcement is exposed at a second surface of the second composite layer such that a second electrical conductivity of the second composite layer is increased in a direction substantially perpendicular to the second composite layer;
   wherein the first portion of the first reinforcement exposed at the first surface of the first composite layer contacts the second portion of the second reinforcement exposed at the second surface of the second composite layer when the second composite layer and the first composite layer are positioned relative to each other to form the skin panel; and
   wherein contact between the first portion of the first reinforcement and the second portion of the second reinforcement electrically connects the first composite layer and the second composite layer to provide a desired level of electrical conductivity in a direction substantially parallel to a z-axis for the skin panel;
   wherein the first reinforcement and the second reinforcement each comprise a plurality of conductive fibers; and
   wherein the first portion and the second portion each comprise exposed parts of some the plurality of conductive fibers through which a number of electrical currents is allowed to flow into and out of a composite layer.

2. The skin panel of claim 1, wherein the first portion of the first reinforcement is exposed at a selected portion of the first surface such that the desired level of electrical conductivity of the composite layer is increased in the direction substantially perpendicular to the composite layer at the selected portion of a surface.

3. The skin panel of claim 1, wherein the first composite layer and the second composite layer are layers in a plurality of composite layers that form the skin panel.

4. The skin panel of claim 3, wherein an electromagnetic event that occurs in an environment around the plurality of composite layers induces electrical energy in the plurality of composite layers and wherein the plurality of composite layers conducts the electrical energy between the composite layers in the plurality of composite layers in the direction substantially parallel to the z-axis for the plurality of composite layers.

5. The skin panel of claim 3, wherein the skin panel comprising the plurality of composite layers is a carbon fiber reinforced plastic.

6. The skin panel of claim 1, wherein the first portion of the first reinforcement embedded in the first matrix is exposed at the first surface of the composite layer using at least one of a mechanical process, a chemical process, a laser surface ablation process, an etching process, a threading process, a stitching process, an abrasion process, a sanding process, and a raking process.

7. A skin panel for an aerospace vehicle comprising:
   a plurality of composite layers in which a first composite layer in the plurality of composite layers comprises:
      a first matrix comprising a substantially nonconductive material; and
      a first reinforcement comprising a conductive material and located within the first matrix in which a first portion of the first reinforcement is transversely located within the first matrix perpendicular to a z-axis for the first composite layer and exposed at a first surface of the first composite layer such that a first electrical conductivity of the first composite layer is increased in a direction substantially perpendicular to the first composite layer, wherein the first portion of the first reinforcement exposed at a surface of the first composite layer electrically connects the first composite layer to another composite layer in the plurality of composite layers such that a composite structure has a desired level of electrical conductivity in a direction substantially parallel to a z-axis for the composite structure;
   wherein the first reinforcement comprises a plurality of conductive fibers; and
   wherein the first portion comprises exposed parts of some of the plurality of conductive fibers through which a number of electrical currents is allowed to flow into and out of the composite layer.

8. The skin panel of claim 7, wherein the skin panel comprising the plurality of composite layers is carbon fiber reinforced plastic.

9. A method for conducting electrical energy using a composite structure, the method comprising:

operating an object comprising the composite structure in which the electrical energy is induced in the composite structure in response to an electromagnetic event that occurs during operation of the object, wherein the composite structure comprises a plurality of composite layers in which a composite layer in the plurality of composite layers comprises:
- a matrix comprising a substantially nonconductive material; and
- a reinforcement comprising a conductive material and located within the matrix in which a portion of the reinforcement is exposed at a surface of the composite layer; and conducting the electrical energy induced in the composite structure in response to the electromagnetic event within the composite structure using the portion of the reinforcement exposed at the surface of the composite layer in the plurality of composite layers such that electrical conductivity of the composite structure is increased in a direction substantially parallel to a z-axis for the composite structure;

wherein the reinforcement comprises a plurality of conductive fibers and the portion comprises exposed parts of some of the plurality of conductive fibers through which a number of electrical currents is allowed to flow into and out of the composite layer.

10. The method of claim 9, wherein the step of conducting the electrical energy induced in the composite structure in response to the electromagnetic event within the composite structure using the portion of the reinforcement exposed at the surface of the composite layer in the plurality of composite layers such that an electrical conductivity of the composite structure is increased in the direction substantially parallel to the z-axis for the composite structure comprises:

conducting the electrical energy induced in the composite structure in response to the electromagnetic event within the composite structure such that the electrical conductivity of the composite structure is increased in the direction substantially parallel to the z-axis for the composite structure, wherein the portion of the reinforcement exposed at the surface of the composite layer electrically connects the composite layer to another composite layer in the plurality of composite layers such that the composite structure has a desired level of electrical conductivity in the direction substantially parallel to the z-axis for the composite structure; wherein the reinforcement comprises a plurality of conductive fibers and the portion comprises exposed parts of some of the plurality of conductive fibers through which a number of electrical currents is allowed to flow into and out of the composite layer.

* * * * *

UNITED STATES PATENT AND TRADEMARK OFFICE
CERTIFICATE OF CORRECTION

PATENT NO. : 10,046,528 B2
APPLICATION NO. : 13/400334
DATED : August 14, 2018
INVENTOR(S) : Gaw Page 1 of 1

It is certified that error appears in the above-identified patent and that said Letters Patent is hereby corrected as shown below:

In the Claims

Column 18, Line 5, change "some the plurality" to --some of the plurality--
Column 18, Line 12, change "the composite layer" to --the first composite layer--
Column 18, Line 13, change "the composite layer" to --the first composite layer--
Column 18, Line 14, change "of a surface" to --of the first surface--
Column 18, Lines 22-23, change "between the composite layers" to --between composite layers--
Column 18, Line 24, change "the z-axis" to --a z-axis--
Column 18, Line 31, change "the composite layer" to --the first composite layer--
Column 18, Line 62, change "the composite layer" to --the first composite layer--

Signed and Sealed this
Twenty-fifth Day of December, 2018

Andrei Iancu
*Director of the United States Patent and Trademark Office*